Patented Aug. 13, 1940

2,210,929

UNITED STATES PATENT OFFICE 2,210,929

INSECTICIDAL COMPOSITION

Sheldon B. Heath and Merlin O. Keller, Midland, Mich., assignors to The Dow Chemical Company, Midland, Mich., a corporation of Michigan No Drawing. Application March 28, 1938, Serial No. 198,492

9 Claims. (Cl. 167—31)

This invention concerns sprays and dusts comprising dinitro-phenols, means for improving their insecticidal characteristics, and the treatment of plants therewith.

The dinitro-phenols and ring-substituted derivatives thereof are known to have insecticidal properties, but when applied to plants as dusts or aqueous suspensions in the amounts generally required for satisfactory insect control, they also cause severe injury with defoliation, retardation of normal plant development, and metabolic disturbances.

It has been suggested that the dinitro-phenols are less harmful to plants and foliage when employed in low concentrations as constituents of horticultural sprays and dusts. In certain compositions, the dinitro-phenol is dissolved in an oil and this solution emulsified with water. The dinitro-phenols as a class, however, are somewhat soluble in water so that the partition coefficient for distribution of the phenol compound between the oil and water is frequently low. Since the effectiveness of such compositions has been shown to be directly proportional to the amount of the compound dissolved in the oil, the loss in the run off of the water-soluble portion of the dinitro-phenol materially reduces the effectiveness of the oily residues remaining on the tree or plant. Surface waters containing alkaline salts and frequently employed in making up spray compositions react with the dinitro-phenols to form phenolates which are much more soluble in water than are the free phenol compounds and potentially very injurious to growing vegetation. The result, then, of the dissolving out of a portion of the dinitro-phenol compound by the water is not only to reduce the insecticidal efficiency of the composition, but also to introduce into the aqueous phase of such composition toxic compounds capable of seriously injuring plants sprayed therewith. To compensate for the impaired insecticidal efficiency of such spray compositions, increased amounts of dinitro-phenol compound have been employed, resulting not only in an increased cost for insect control but also in increased plant injury.

Dinitro-phenols may also be ground or otherwise intimately incorporated with finely divided inert solids to form insecticidal dusts. After such materials are applied to the foliage of growing plants, the dinitro compound is frequently dissolved out and away from the dusted surfaces by rain and dew, with the result that the repellent and toxic action of the dust residue is transitory. Furthermore, such commonly employed solid diluents as bentonite, diatomaceous earth, and the like, frequently react with an appreciable proportion of the dinitro-phenol compound to form alkaline earth and alkali metal phenolates, which, as pointed out above, not only have an increased solubility in water, but also complicate the plant injury problem.

We have discovered that the above disadvantages are minimized and the insecticidal characteristics of dinitro-phenol containing dusts and sprays improved by the addition thereto of water-soluble acid-acting reagents or acid buffering agents in amount sufficient to establish and maintain in aqueous dispersions of the insecticide composition a relatively low pH value. The imparting of acid pH values to oil-water emulsions reduces the solubility of the dinitro-phenol constituent in the aqueous phase. In the case of acidified dusts, the dinitro-phenol is less liable to be extracted out by rain or dew subsequent to application. Dinitro-phenol compositions of relatively low pH have been found to have higher initial and longer residual insecticidal toxicities than do compositions of alkaline or less acid reaction. Furthermore, the increased insecticidal efficiency resulting from the reduced water solubility of the dinitro-phenol makes feasible the use of smaller amounts of the latter than heretofore has been considered practical, thereby reducing the danger of plant injury. The term "dinitro-phenols" employed in the specification and claims includes not only the dinitro-hydroxy benzenes, but also the dinitro-naphthols and all dinitro-phenols having insecticidal value and in which the benzene ring is substituted by an inert radical such as alkyl, aralkyl, aryl, cycloalkyl, halo, substituted-amino, and similar groups.

The dinitro-phenols as a class vary widely in water-solubility at any given pH value and are not equally injurious to growing plants or to all species of plant growth. We add sufficient of an acid-acting reagent or acid buffering agent to the insecticidal composition that the aqueous phase of a dispersion of the material has such a pH value and resulting solvent capacity for the dnitro-phenol as to limit the concentration of the latter to below that concentration capable of causing substantial plant injury. The average concentration of the dinitro-phenols in water below which it is apparently advisable to operate is approximately 30 milligrams per liter. The pH value required to limit the solubility of the dinitro-phenols to below this concentration is generally between about 3.0 and 5.0 although somewhat lower or higher pH values may be suitable for certain compounds. At pH values within this range, we have found it possible to reduce the dinitro-phenol content of insecticide compositions by from 25 to 50 per cent without reducing the efficiency of insect control.

The acid chemical or buffering agent employed to control the pH value may, in the case of a spray, be incorporated either with the spray concentrate or with the dilute aqueous material prior to application. With dusting compositions, it is generally advisable to intimately incorporate the acid-acting reagent or buffering material directly into the mixture during preparation.

The following examples illustrate certain embodiments of our invention but are not to be construed as limiting the same:

EXAMPLE 1

Aqueous solutions of various dinitro-phenols were tested to determine the maximum concentration of the phenol compound in water which could be applied to the leaves of growing plants without causing serious injury thereto. It was found that the critical concentration varied both with the particular compound and the plant concerned. On geraniums, amounts of 2.4-dinitro-6-cyclohexyl phenol in excess of 0.025 pound per 100 gallons of solution caused substantial leaf injury within three weeks after spraying. This concentration of 2.4-dinitro-6-cyclohexyl phenol was equivalent to a 0.003 per cent by weight solution or 30 milligrams of the phenol per liter of solution. The solubility of 2.4-dinitro-6-cyclohexyl phenol in water of varying pH value was found to be as follows:

| pH | Solubility in milligrams per liter |
| --- | --- |
| 3 | 5.5 |
| 4 | 8.5 |
| 5 | 13.0 |
| 5.5 | 17.0 |
| 6 | 25.0 |
| 6.5 | 41.5 |
| 6.75 | 70.0 |

(All determinations at 20° C.)

From the above, it is evident that the aqueous phase of a spray material comprising 2.4-dinitro-6-cyclohexyl phenol should be maintained at a pH value not substantially in excess of 6.0 if plant injury by 2.4-dinitro-6-cyclohexyl phenol in aqueous solution is to be avoided. It further appears that at pH values in excess of 5.0, the 2.4-dinitro-6-cyclohexyl phenol would be rapidly extracted by water from oil or other organic solvents or dissolved away from tree surfaces upon contact with rain or dew.

The following are representative of the solubilities of dinitro-phenols in water at pH values ranging between 3 and 7.5:

2.4-dinitro-6-cyclopentyl phenol

| pH | Solubility in milligrams per liter |
| --- | --- |
| 3 | 5.5 |
| 4 | 9.5 |
| 5 | 24.5 |
| 5.5 | 45.0 |
| 5.75 | 62.5 |

(Determinations at 20° C.)

2.4-dinitro-6-normal-hexyl phenol

| pH | Solubility in milligrams per liter |
| --- | --- |
| 3 | 2.75 |
| 4 | 5.0 |
| 5 | 10.0 |
| 5.5 | 15.5 |
| 6 | 24.5 |
| 7 | 55.0 |

(Determinations at 21.5° C.)

2.4-dinitro-6-normal-octyl phenol

| pH | Solubility in milligrams per liter |
| --- | --- |
| 3 | 2.0 |
| 4 | 3.5 |
| 5 | 6.5 |
| 6 | 12.0 |
| 7 | 21.0 |
| 7.5 | 28.5 |

(Determinations at 21.5° C.)

1-hydroxy-2.4-dinitro-5-(4-chloro-anilido)-benzene

| pH | Solubility in milligrams per liter |
| --- | --- |
| 3 | 0.5 |
| 4 | 1.0 |
| 5 | 3.0 |
| 6 | 8.5 |

(Determinations at 20° C.)

EXAMPLE 2

Tests were made to approximate the effect of repeated extraction by rain water or dew on the pH value of deposits of acidified dust and spray materials comprising the dinitro-phenols. This was accomplished by suspending a finely divided dust containing the dinitro-phenol, an acid-acting agent, a wetting agent, and various finely divided inert solids in distilled water and surface water high in alkaline earth and alkali metal salts, subsequently decanting the liquid from the solid suspension, and thereafter repeatedly extracting the moist residues of solid spray material with additional amounts of water. After each extraction, the pH value of an aqueous suspension of the washed residue was determined.

In a representative test, a composition was first prepared by fusing together 25 parts by weight of 2.4-dinitro-6-cyclohexyl phenol and 11 parts by weight of bentonite. This fusion mixture was then cooled, roughly comminuted, and employed as a base material to which wetting agents, finely divided organic and inorganic flours, and acids and acid buffering agents were added in the amount desired. Representative of the materials added as solid diluents were diatomaceous earth and finely divided walnut shell. For cake of uniformity, an alkali metal salt of a sulphonated aromatic hydrocarbon was used in all compositions as the wetting agent. Aluminum sulphate $(Al_2(SO_4)_3 \cdot 18H_2O)$ is representative of the acid buffering agents employed.

In each instance, it was found that the continued extraction of an unbuffered and unacidified composition resulted in a rapid loss of dinitro-phenol, the pH value of a suspension of the composition generally approaching that of a suspension of the finely divided carrier employed as diluent. The addition of sufficient of an acid chemical, e. g. aluminum sulphate, to give an initial pH value of 4 or below, substantially retarded the extraction of the phenol on washing with water, and resulted in compositions, suspensions of which, even after 3 and 4 washings, retained a pH value of below 5.

For example, 0.36 pound of the fusion mixture described above was mixed with 0.05 pound of wetting agent, and 3.56 pounds of walnut shell flour, and suspended in 100 gallons of distilled water. The dispersion of 2.4-dinitro-6-cyclohexyl phenol had an initial pH value of 5.6. Three extractions with distilled water of an aliquot portion of the dispersion gave residues which in suspension had pH values of 5.7, 5.8, and 6.2, respectively. 1.0 pound of aluminum sulphate (18H2O) was thereafter added to 100 gallons of the above dispersion and an aliquot portion of this acidified mixture withdrawn and extracted in a similar manner. The initial pH of the buffered mixture was 3.8, the three successive extractions resulting in material which in suspension had pH values of 4.1, 4.4, and 4.7, respectively.

The following table sets forth representative data obtained in determining the efficiency and permanence of the dinitro-phenols in compositions initially acidified to a pH of 4 or below as compared with compositions to which no acid had been added.

| Material | Concentration | pH of mixtures | | | |
|---|---|---|---|---|---|
| | | Original | First extraction | Second extraction | Third extraction |
| 0.36 pound fusion mixture, 0.05 pound wetting agent, 3.5 pounds walnut shell flour. | Made up to 100 gallons with distilled water (pH 6.8). | 5.6 | 5.7 | 5.8 | 6.2 |
| 0.36 pound fusion mixture, 0.05 pound wetting agent, 3.5 pounds walnut shell flour. | Made up to 100 gallons with surface water high in natural salts (pH 8). | 6.8 | 6.5 | 6.4 | 6.3 |
| 0.36 pound fusion mixture, 0.05 pound wetting agent, 3.59 pounds walnut shell flour, 1.0 pound aluminum sulphate. | Made up to 100 gallons with distilled water (pH 6.8). | 3.8 | 4.1 | 4.4 | 4.7 |
| 0.36 pound fusion mixture, 0.05 pound wetting agent, 3.59 pounds walnut shell flour, 1.0 pound aluminum sulphate. | Made up to 100 gallons with surface water high in natural salts (pH 8). | 4.2 | 4.3 | 4.6 | 4.9 |
| 0.36 pound fusion mixture, 0.05 pound wetting agent, 3.59 pounds diatomaceous earth. | Made up to 100 gallons with distilled water (pH 6.8). | 5.0 | 6.0 | 6.0 | 5.9 |
| 0.36 pound fusion mixture, 0.05 pound wetting agent, 3.59 pounds diatomaceous earth. | Made up to 100 gallons with surface water high in natural salts (pH 8). | 6.8 | 6.5 | 6.3 | 6.2 |
| 0.36 pound fusion mixture, 0.05 pound wetting agent, 3.59 pounds diatomaceous earth, 1.0 pound aluminum sulphate. | Made up to 100 gallons with distilled water (pH 6.8). | 4.0 | 4.1 | 4.4 | 4.7 |
| 0.36 pound fusion mixture, 0.05 pound wetting agent, 3.59 pounds diatomaceous earth, 1.0 pound aluminum sulphate. | Made up to 100 gallons with surface water high in natural salts (pH 8). | 4.2 | 4.3 | 4.5 | 4.8 |

In the above experiments, repeated washing of the unbuffered compositions resulted in the rapid extraction of the dinitro-phenol compound, the pH of the extract and residues approaching a limiting value which is characteristic for the finely divided solid filler, e. g., from approximately 6 to 6.2. The wash waters from the unacidified mixtures were yellow in color, indicating that the phenol was dissolved therein or had been reacted with certain mineral constituents thereof to form the water-soluble phenolates. Liquors from the extraction of the acidified compositions were substantially colorless.

The aluminum sulphate containing dust compositions set forth above were found to have a high toxicity against insects and to be substantially non-injurious to living plants. For example, a composition comprising 5 per cent of 2.4-dinitro-6-cyclohexyl phenol, 20 per cent aluminum sulphate, 5 per cent combined bentonite and wetting agent, and 70 per cent walnut shell flour was found to have a m. l. d. (median lethal dose) value of 0.123 milligram per gram of insect body weight when tested against Fifth Instar silkworms by the leaf sandwich method substantially as described by Campbell and Filmer, Trans. IV. International Cong. Ent. 523–533 (1929), and Campbell, Jour. Econ. Ent. 23:357–370.

EXAMPLE 3

3 parts by weight of 2.4-dinitro-6-cyclohexyl phenol was dissolved in 97 parts by weight of a lubricating oil having an unsulphonatable residue of 82 per cent, a Saybolt viscosity of 100–110 seconds, and a boiling range of 606°–742° F. 6.25 pounds of this solution was emulsified with 0.75 pound of bentonite, 0.75 pound of dried sulphite pulping waste, 1 pound of aluminum sulphate, and sufficient water to form 100 gallons of spray having a pH value of approximately 4. The concentrations of oil and dinitro-cyclohexyl phenol in the finished spray composition were approximately 0.73 and 0.0225 per cent by weight, respectively.

This spray material was applied as a dormant spray to mature apple trees for the control of the rosy apple aphis. The percentage aphid control was determined by comparison of the number of aphid-infested growing tips or points observed on sprayed and control trees after their complete foliation, and was calculated according to the Abbott formula, i. e., the percentage control equals $$\frac{X-Y}{X} \times 100$$

X represents the average number of infested growing points on the check or control trees, and Y represents the average number of infested growing points on the treated trees. The expression "growing point" may be defined as any lateral or terminal shoot or spur with or without fruit.

A 99 per cent control of rosy apple aphis was accomplished by the treatment. Periodical examination of the sprayed trees throughout the growing season showed no commercial injury attributable to the spray application. Examination of ripened fruit from the sprayed trees showed substantially no aphid injury, while fruit from unsprayed control trees was seriously damaged.

In a similar manner, oil emulsion compositions comprising various amounts of the lubricating oil and 2.4-dinitro-6-cyclohexyl phenol were prepared in which the aluminum sulphate was not included. It was found that an unacidified composition containing 0.72 per cent by weight of oil and 0.03 per cent of 2.4-dinitro-6-cyclohexyl phenol and having a pH value of between 7 and 8 gave only 87 per cent control of aphids when applied to mature apple trees. In order to equal the control accomplished by the aluminum sulphate containing spray, an unacidified spray composition was required comprising 1.25 and 0.052 per cent by weight of oil and 2.4-dinitro-6-cyclohexyl phenol, respectively.

The above results show that more than twice the amount of 2.4-dinitro-6-cyclohexyl phenol and half again as much oil are required in a spray at a pH value of 7 to 8 to accomplish a substantially complete control of rosy apple aphis as is necessary where the pH value of the spray composition is adjusted to approximately 4.

EXAMPLE 4

The insecticidal efficiencies of a number of spray materials containing dinitro-phenols were determined against codling moth larvae. Winesap apples, size 150, and of a good grade, were used in carrying out the tests, the apples being thoroughly washed and the stem and calyx cavities sealed with paraffine to prevent the entrance of larvae through these vulnerable zones. Each apple was sprayed by means of an atomizer with approximately 10 cubic milliliters of the test material, after which it was stored under laboratory conditions for 24 hours. A small piece of waxed paper, bearing 10 codling moth eggs was then pinned to each apple, and the apples placed in a darkened incubator at 28.5° C. and 70 per cent relative humidity for 5 days to allow time for the hatching of the eggs and for the resulting larvae to either attack the apple or be destroyed by the spray material applied. Following the incubation period, the apples were examined to determine the number of hatched and sterile eggs, and the number of stings and entries on the sprayed surfaces. An attack by a newly hatched larva upon the apple was considered a sting if the larva had penetrated less than one-quarter of an inch into the apple and was not found to be living. The injury was considered an entry if the larva was found or the hole was more than one-quarter of an inch in depth.

The method employed for calculation and comparison of results is that suggested by the Insecticide and Fungicide Board of the United States Bureau of Entomology. This method considers the number of larvae hatching and the number of entries on the apples in both the test and check runs. For example, the percentage control for any given spray material is calculated as being $$100 - \frac{\text{number of entries} \times 100}{\text{total number of larvae hatched}}$$

The percentage control for any given spray as compared to the check runs is calculated from an Abbott type formula where $X$ represents the percentage control of the check run and $Y$ represents the percentage control of a run made with the spray composition, i. e., $$\frac{Y-X}{X} \times 100$$

An aqueous suspension of 2.4-dinitro-6-cyclohexyl phenol at a pH value of 4 was sprayed on test apples and allowed 100 entries into the apples by 324 freshly hatched larvae. In a check or control run, 606 freshly hatched larvae produced 423 entries. The per cent control for the phenolic suspension was therefore $$100 - \frac{100 \times 100}{324}$$

or 69.2 per cent. Similarly, the per cent control of the check run was 30.2. The per cent control of the dinitro-phenolic suspension as compared with that of the check was found to be $$\frac{69.2-30.2}{30.2} \times 100$$

or 129.1.

The above aqueous suspension of 2.4-dinitro-6-cyclohexyl phenol was prepared by grinding together 1 part by weight of 2.4-dinitro-6-cyclohexyl phenol with 3 parts of diatomaceous earth and suspending the resulting impalpable mixture in water in an amount equivalent to 4 pounds of the dust mixture to 100 gallons of water. Sufficient oxalic acid was thereafter added to bring the pH value of the suspension to below 4. In a like manner, suspensions of this phenol were adjusted to pH values of 7 and 10–11 by the addition of suitable acids or bases and their comparative insecticidal efficiencies determined according to the foregoing procedure.

Similarly, oil-water emulsions containing 2.4-dinitro-6-cyclohexyl phenol were adjusted to varying pH values and tested. In preparing these emulsions, 4 grams of 2.4-dinitro-6-cyclohexyl phenol was dissolved in 96 grams of a lubricating oil having an unsulphonatable residue of 77 per cent and a Saybolt viscosity of 76 seconds. 75 parts by weight of the resulting solution was emulsified with 0.5 part of blood albumen, 1.5 parts of diatomaceous earth, and 23 parts of water to give a stock emulsion which was thereafter diluted with sufficient water to give a test composition containing 2 per cent by weight of the oil-phenol solution. The following table sets forth data obtained for certain of the above representative spray compositions and a check or control run in which the apples were exposed to the uninhibited attack of the freshly hatched larvae.

| Material | Concentration | pH | No. eggs hatched | No. of entries | Percent control | Net percent control compared with check |
|---|---|---|---|---|---|---|
| 1 part by weight of 2.4-dinitro-6-cyclohexyl phenol+3 parts by weight of diatomaceous earth+oxalic acid. | 4 pounds of mixture per 100 gallons of water. | Less than 4. | 324 | 100 | 69.2 | 129.1 |
| 1 part by weight of 2.4-dinitro-6-cyclohexyl phenol+3 parts by weight of diatomaceous earth. | 4 pounds of mixture per 100 gallons of water. | Approx. 7 | 342 | 115 | 66.4 | 119.8 |
| 1 part by weight of 2.4-dintro-6-cyclohexylphenol+3 parts by weight of diatomaceous earth+sodium hydroxide. | 4 pounds of mixture per 100 gallons of water. | 10–11 | 149 | 84 | 43.7 | 44.7 |
| Oil-water emulsion containing 2.4-dinitro-6-cyclohexyl phenol+oxalic acid. | 2 per cent of oil-phenol solution in water. | Approx. 4 | 139 | 82 | 41.1 | 36 |
| Oil-water emulsion containing 2.4-dinitro-6-cyclohexyl phenol. | 2 per cent of oil-phenol solution in water. | Approx. 7 | 198 | 130 | 34.4 | 13.9 |
| Check | Check | Check | 606 | 423 | 30.2 | 0 |

The above results show that a 2.4-dinitro-6-cyclohexyl phenol suspension at a pH value of 4 is almost three times as effective compared with control as is a similar composition when adjusted to a pH of 11, and that an aqueous emulsion comprising 2.4-dinitro-6-cyclohexyl phenol and oil at a pH value of 4 is over twice as effective as is a similar composition at a pH of approximately 7 with respect to the check run.

While the foregoing examples for the most part concern compositions comprising 2.4-dinitro-6-cyclohexyl phenol, it is to be understood that our new method for improving dinitrophenol containing insecticidal compositions is also applicable to sprays and dusts containing such phenols as 2.4-dinitro-6-tertiary-butyl phenol, dinitro-alpha-naphthol, 2.4-dinitro-phenol, 2.4-dinitro-cresol, 2.6-dinitro-paracresol, 2.5-dinitro-para-cresol, 2.4-dinitro-6-chloro-phenol, 2.4-dinitro-5-cyclohexyl phenol, 2.4-dinitro-6-ethyl phenol, 2.4-dinitro-6-benzyl phenol, 2.5-di-isopropyl-4.6-dinitro phenol, and the like. Similarly, any suitable acid-acting reagent may be employed to obtain the desired pH values, e. g., acetic acid, hydrochloric acid, nitric acid, sulphuric acid, etc. Acid buffering agents such as sodium bisulphate, ammonium sulphate, ammonium nitrate, copper sulphate, and salts of strong acids and weak bases generally also may be employed to obtain the desired pH values.

Other modes of applying the principle of our invention may be employed instead of those explained, change being made as regards the products and methods herein disclosed, provided the compositions or steps stated by any of the following claims or the equivalent of such stated compositions or steps be employed.

We therefore particularly point out and distinctly claim as our invention:

1. An insecticidal composition adapted to be employed as a horticultural spray or dust, comprising a dinitro-phenol and sufficient of a water-soluble acid buffering agent to establish and maintain in aqueous dispersions of the composition a pH value of below 5.

2. An insecticidal composition adapted to be employed as a horticultural spray or dust, comprising 2.4-dinitro-6-cyclohexyl phenol and sufficient of a water-soluble acid-acting reagent to establish and maintain in aqueous dispersions of the composition a pH value of below 5.

3. An oil-water emulsion adapted to be employed as an insecticidal spray, comprising a dinitro-phenol and sufficient of a water-soluble acid-acting reagent to establish and maintain a pH value of between 3 and 5 in the aqueous phase of the composition.

4. An oil-water emulsion adapted to be employed as an insecticidal spray, comprising 2.4-dinitro-6-cyclohexyl phenol and an acid buffering agent adapted to establish and maintain a pH value of between 3 and 5 in the aqueous phase of the composition.

5. In the treatment of living plants with insecticidal sprays and dusts comprising as an active toxicant a dinitro-phenol, the steps which consist in combining with the insecticidal composition prior to its application sufficient of a water-soluble acid-acting reagent to establish and maintain in an aqueous dispersion of the composition a pH value of below 5, and applying the same to the plant.

6. In the treatment of living plants with insecticidal sprays and dusts comprising as an active toxicant a dinitro-phenol, the steps which consist in combining with the insecticidal composition prior to its application an acid-buffering agent which in an aqueous dispersion of the composition establishes and maintains a pH value of between 3 and 5, and applying the same to the plant.

7. In the treatment of insect-infested plants with an oil-water emulsion comprising a dinitro-phenol as the active toxicant, the steps which consist in adding to the insecticidal composition prior to its application sufficient of a water-soluble acid-acting reagent to establish a pH value of between 3 and 5 in the aqueous phase of the emulsion, and applying the same to the plant.

8. In the treatment of living plants with insecticidal sprays and dusts comprising 2.4-dinitro-6-cyclohexyl phenol as an active toxicant, the steps which consist in combining with the insecticidal composition prior to its application sufficient of a water-soluble acid-acting reagent to establish and maintain in an aqueous dispersion of the composition a pH value of between 3 and 5, and applying the same to the plant.

9. In the treatment of insect-infested plants with an oil-water emulsion comprising 2.4-dinitro-6-cyclohexyl phenol as an active toxicant, the steps which consist in adding to the insecticidal composition prior to its application sufficient of a water-soluble acid-acting reagent to establish a pH value of between 3 and 5 in the aqueous phase of the emulsion, and applying the same to the plant.

SHELDON B. HEATH.
MERLIN O. KELLER.